May 1, 1945. B. W. WILLIAMS ET AL 2,375,059
CARDIOMETRIC APPARATUS
Filed July 14, 1941 3 Sheets-Sheet 2
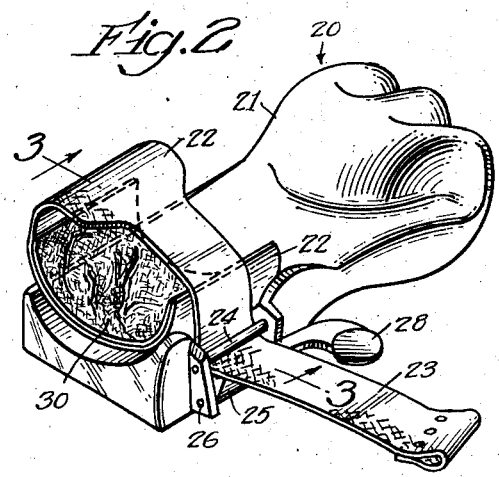
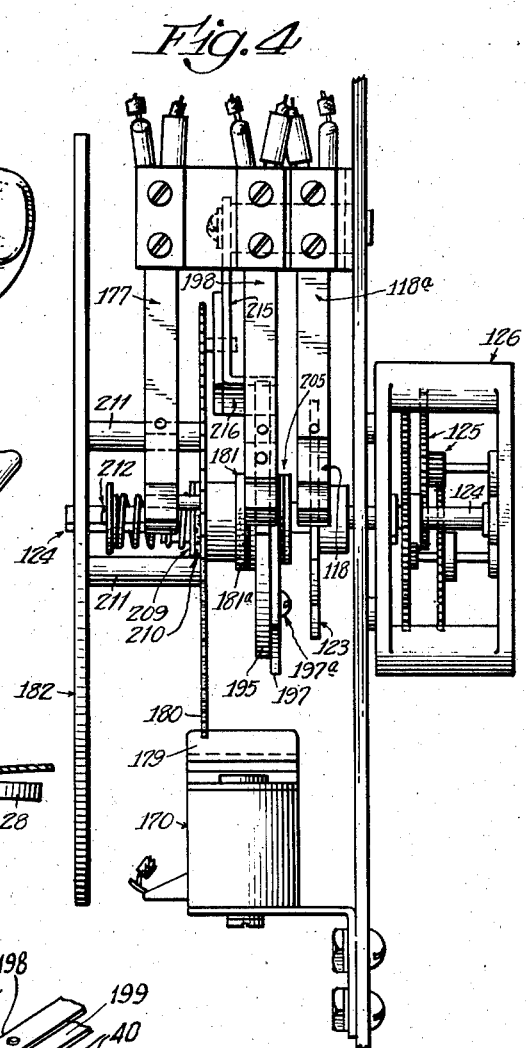
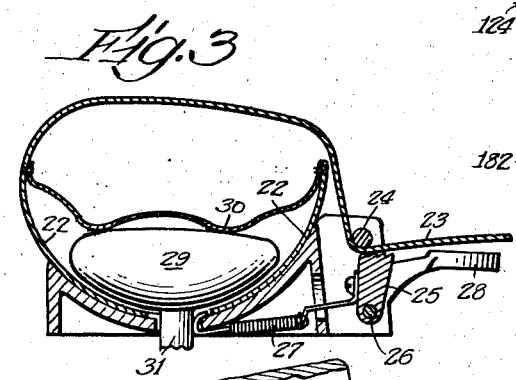
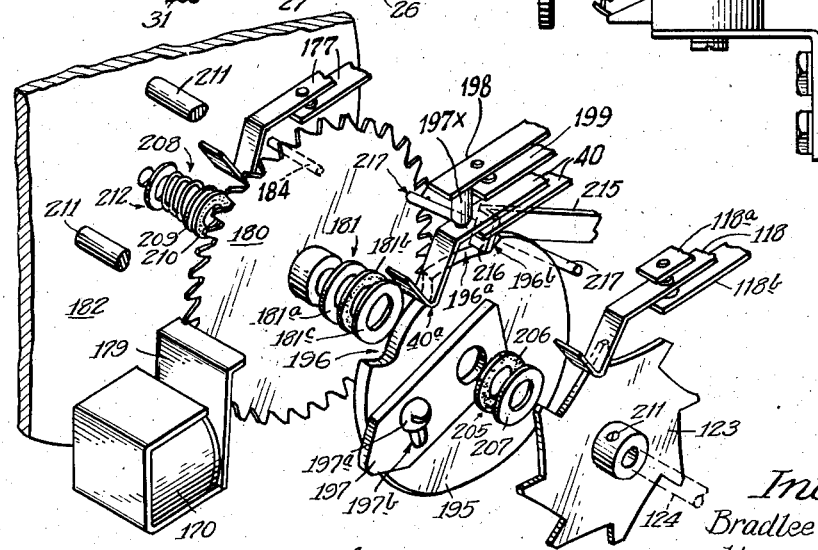
Inventors:
Bradlee W. Williams
Homer S. Williams

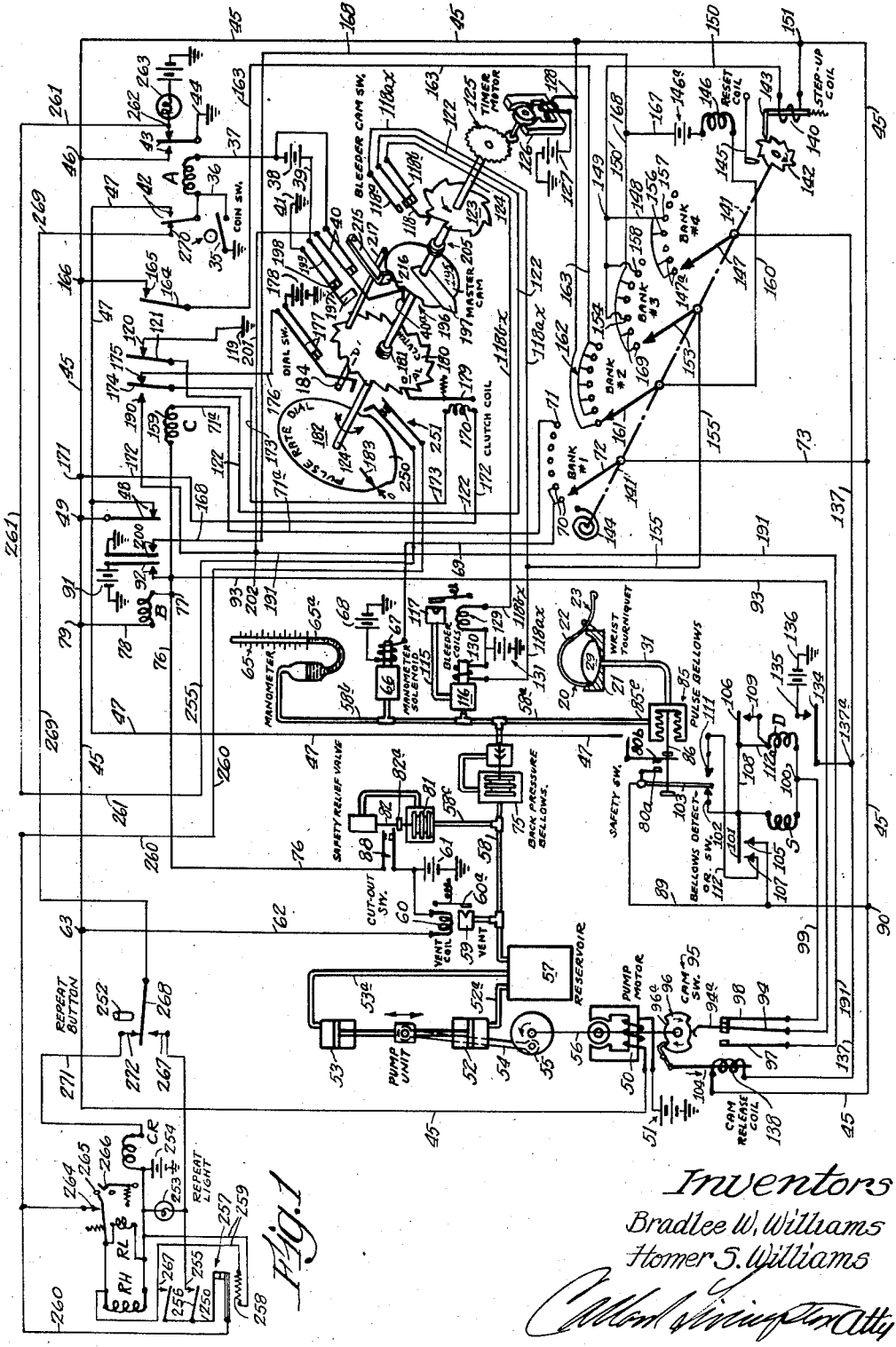

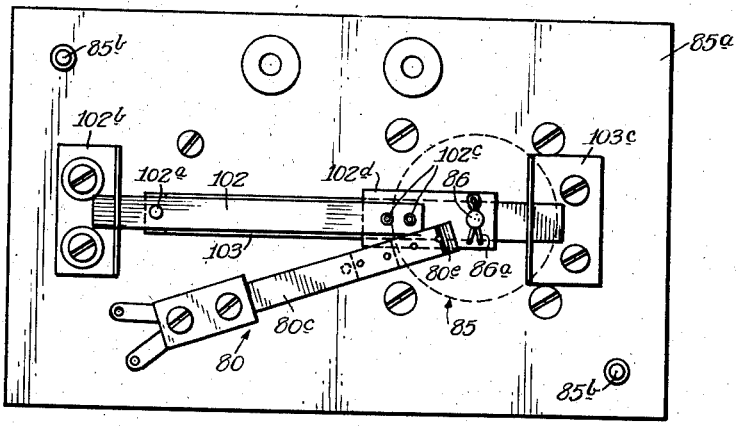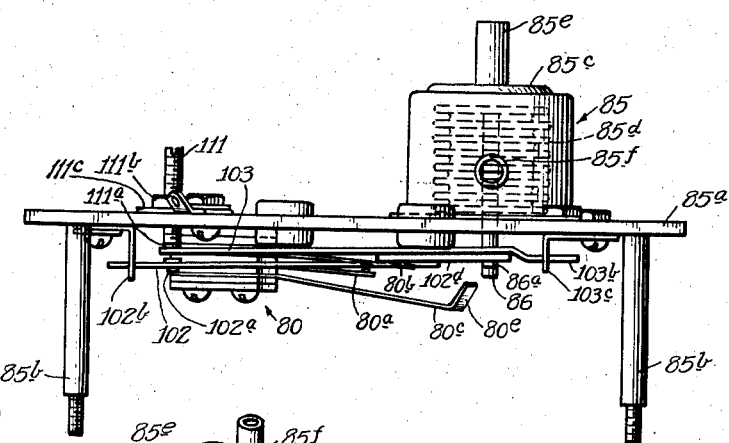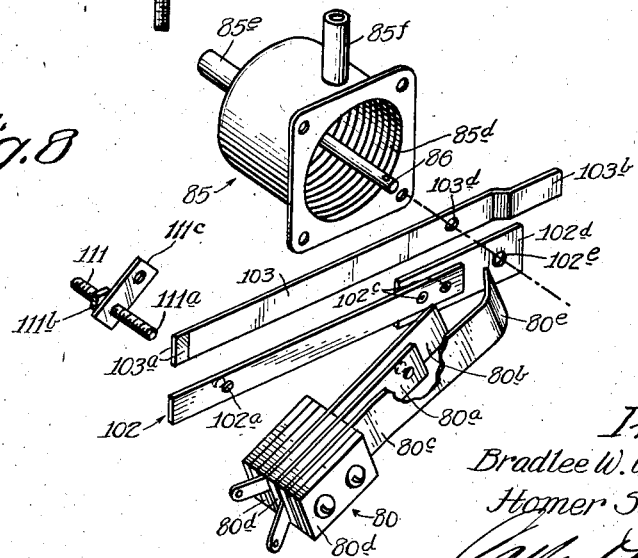

Patented May 1, 1945

2,375,059

UNITED STATES PATENT OFFICE 2,375,059

CARDIOMETRIC APPARATUS

Bradlee W. Williams and Homer S. Williams, Chicago, Ill., assignors to Tech Equipment Company, Chicago, Ill.

Application July 14, 1941, Serial No. 402,358

37 Claims. (Cl. 128—2.05)

This invention pertains to the measurement and detection of pressures and pulsations in a fluid pressure system, especially the arterial system of the human body, and is primarily concerned with the provision of apparatus for automatically ascertaining arterio-cardiometric data including the pulse rate and the arterial tension or blood pressure in individuals using the apparatus.

It is a principal object of the invention to provide an apparatus for automatically applying a pressure to an artery, for detecting pulses in said artery, and for varying the applied pressure under control of the detecting means to obtain a balance between the applied and arterial pressures and thereby provide a measure of the relative blood pressure of the individual under test.

It is also an object to manifest the pressure thus ascertained, as well as the rate of said pulses.

A further object of great importance is the provision of means effective to apply an extraneous or artificial pressure to a selected artery by means of a single arm strap or tourniquet, and which will cooperate with the pulse detecting means, thereby eliminating the need for two arm bands or tourniquets, as required in other forms of apparatus of this class.

It is also a very important object to provide a tourniquet applicable to the wrist of the subject under test both for the purpose of applying the usual occluding pressure, and for detecting pulses, so that the patron need not remove his coat or raise up the sleeve, as required by tourniquets which apply the pressure to the forearm or upper arm.

Yet another object is the provision of a blood-pressure ascertaining apparatus in which there is utilized a single tourniquet applied at the region of the wrist, which tourniquet is automatically tensioned by fluid displacement, as by being inflated with air, together with a pulse detecting means including a pressure responsive switch included in the fluid displacing or inflating circuit with the tourniquet, to detect the presence or absence of arterial pulses upon occlusion or release of the blood flow by the tourniquet, the detecting switch operating to control the fluid displacing or inflating means.

A still further object is the provision of an improved testing arrangement to test for a certain number of pulses—or the lack thereof, in a certain interval, as a means for controlling accurate operation of the apparatus.

Further objects are the provision of a simplified and less expensive apparatus of the character described, which is suitable for operation automatically, as in a coin-controlled machine—or in the hands of the unskilled; to provide novel and effective pressure-detecting switch mechanism which is self-adjusting for weak or strong pressure pulses or sudden and disproportionate changes in operating pressures; to provide automatic circuit control means of simplified character making possible the elimination of numerous mechanisms and circuit connections heretofore required in truly automatic apparatus of this class and which is to be capable of unsupervised, reliable automatic operation in the hands of the laity; to provide an improved tourniquet structure; to provide improved switch mechanism actuated by a form of impositive drive or slip clutch; to provide simple supervisory controls for permitting the pressure in the system to be elevated to a predetermined value as a means of saving time, and to shut off the apparatus automatically should the patron withdraw his wrist from the tourniquet before completion of the test.

A still further object of importance in connection with the coin-controlled embodiment of the invention is the provision of a supervisory repeat circuit which operates to condition the apparatus for a repeat operation without use of a coin under certain conditions indicative of a possibly faulty reading.

Other objects, advantages, and novel aspects of the invention reside in certain details of the construction and function and organization of the component parts of the combination hereinafter described and shown in the preferred embodiment set forth in the annexed drawings in which:

Fig. 1 is a pictorial schema of the complete apparatus, including circuit connections therefor;

Fig. 2 is a perspective detail of the improved wrist-strap or tourniquet structure;

Fig. 3 is a cross section along lines 3—3 of Fig. 2;

Fig. 4 is a vertical cross section through the timing unit including the pulse count dial;

Fig. 5 is an exploded perspective of part of the timing unit shown in Figs. 1 and 4.

Fig. 6 is a front elevational view of the pulse-actuated sensing switch;

Fig. 7 is a view looking down at Fig. 6;

Fig. 8 is an exploded assembly view of the principal elements of the sensitive switch of Figs. 6 and 7;

In our U. S. Patent No. 2,249,370 we show a cardiometric apparatus for ascertaining the systolic blood pressure, as well as the pulse rate, by mechanism which operates automatically, and preferably under control of a coin. In that arrangement, two arm straps or tourniquets are utilized, one applicable to the forearm to occlude and release the blood flow in the brachial artery, and the other applicable to the wrist to detect pulses in said artery as part of a sensing or detecting means. Additional features of novelty utilized in such a system, are shown in our divisional application S. N. 398,780, filed June 19, 1941.

In the present application, means are disclosed for utilizing only one tourniquet, with the object of further simplifying such an automatic mechanism and adapting it to even greater convenient use and simplicity of operation in the hands of the unskilled.

With the foregoing objects and intentions in view, a preferred form of the new apparatus is set forth in a pictorial schematic arrangement in Fig. 1, intended to show at once in a single view the basic electrical and mechanical elements of the combination in their cooperative relationship.

It may be observed in passing, that solely for purposes of simplicity, the source of electric power has been indicated in a conventional manner by one of the standard symbols for a battery, with common connections to a so-called ground, the object being to eliminate multiplying electrical connections which would otherwise obscure the drawing. Therefore, those skilled in the art will understand that no particular variety of power source is intended, but on the contrary, any suitable type of power source is contemplated by the symbolic showing.

*Introductory statement of operation*

The patron under test deposits a coin to start the machine after strapping his wrist in a tourniquet, whereupon a maximum air pressure is applied through the tourniquet to shut off the blood flow in the brachial artery. The pressure is then reduced step by step until a detecting means associated with the tourniquet stops the pressure reduction, at which time, mechanism is automatically actuated to ascertain the pulse rate during a short testing interval at the conclusion of which the machine automatically shuts off.

The reduction of pressure as aforesaid will be resumed after arrest if a certain number of pulsations are not detected in a testing interval by a special testing arrangement which prevents false pulses from muscular or other involuntary movement from causing improper pressure readings, in the otherwise normal operation of the machine.

In the event the pulse rate reading does not exceed a certain minimum value, the apparatus is automatically conditioned to apprise the patron of the fact and permit him to repeat the entire test without deposit of another coin.

*Detailed description*

The apparatus is arranged to give the systolic pressure reading only, and includes a pressure-applying device or tourniquet 20, such as shown in detail in Fig. 2, and which includes an arm and hand rest 21 shaped to conform to, and receive, the volar aspect of the left wrist, and the hand. Fixed in the trough of the rest is a leather strap 22 having a tongue 23 which passes through a clamping device or jaw consisting of a relatively stationary roller 24 seated in the rest, and a movable jaw member 25 (Fig. 3, also) pivoted as at 26 to grab the underside of the tongue beneath roller 24. A spring 27 normally urges the jaw into clamping position against the tongue and tends automatically to prevent withdrawal (to the left, Fig. 3) thereof. The jaw is released by manually depressing the thumb-lever 28 attached thereto.

Within the tourniquet strap (Figs. 1 and 3 particularly) is an inflatable pressure-applying member or cushion 29, covered by a thin protective shield 30 of silk or like material, and adapted to be connected by a tube or conduit 31 in a fluid pressure system to be inflated and deflated, as by air, in the course of operation of the machine.

The patron inserts his hand in the loop of strap 23 for comfortable, firm, seating on the rest, then pulls the tongue tight, the jaws 25 holding by action of spring 27. Ultimately, cushion 29 will be inflated and press against the volar face of the wrist and exert pressure against the artery lying therebeneath in a manner and for purposes presently to appear.

Included in the system of Fig. 1 is a main control or coin-operated switch 35, which, when closed, as by a coin in the usual manner, energizes a relay A via conductors 36, 37, power source or battery 38, conductor 39 and master cam switch contacts 198—199 to ground 41; this causes contacts 42 and 43 on relay A to close; one of the contacts 43 is grounded at 44 and thereby applies ground to a common conductor 45 at 46, thus setting up a main power circuit or common ground for the entire apparatus.

Relay A locks its own holding circuit from the foregoing battery 38 and normally closed contacts 198, 199 through contacts 42, conductor 47, normally closed contacts 48 on a relay B to the main ground wire 45 at 49.

As a consequence of this energization of relay A and the holding ground thus applied to conductor 45, a pump motor 50 is energized through power source 51, and two pump units 52 and 53 are actuated through driving connections 54, 55, and 56, with motor 50, thus delivering compressed air into a receiver or reservoir 57 via conduits 52a and 53a.

Reservoir 57 discharges fluid (preferably air, but optionally liquid such as water) into a pressure line or system including conduit 58, which is open to the atmosphere when the machine is idle, via a vent valve 59. However, the instant relay A pulls up and locks as aforesaid, a coil 60 for the vent valve is energized from battery 61, via conductor 62 and connection 63 with the main or common ground wire 45, thus causing an armature 60a to close the vent 59, so that the pressure from reservoir 57 may exert itself within the pressure system.

As one of the results of the building up of air pressure as aforesaid, the tourniquet pad or cushion 29 is inflated via branch conduits 58a and 31. Pressure is also exerted via branch conduit 58b upon the well of a mercury manometer 65 to elevate the mercury column 65a therein as the pressure increases in the system.

Normally, that is when the machine is at rest, the manometer is closed off from the pressure system by a manometer solenoid valve 66, which is opened by energization of a solenoid coil 67 from battery 68 and conductor 69 through the first two looped contacts 70 on bank #1 of a commutating switch unit, and thence to the common ground 45 via the wiper contact 72 thereof and conductor 73. Thus, the manometer solenoid valve remains open as long as commutator switch wiper 72 remains on contact 70, providing relay A is energized.

As the air pressure rises in the aforesaid conduit system, cushion 29 presses more and more firmly against the patron's wrist, and when a predetermined pressure, say equivalent to 200 mm. of mercury as measured by the height of the column 65a of mercury in the manometer, has been reached, the flow of blood in the artery of the patron will be occluded, provided of course the patron is not suffering from hypertension or arterial conditions which would cause his pressure to be above this value.

Since the cases where individual systolic blood pressures will rise above 200 mm. Hg are relatively rare, and since it is considered that such persons should be under the observation of a physician in any event, this limit of 200 mm. has been selected as the practical upper working limit of the machine, it being understood however that the assignment of such a limit is purely arbitarary and optional, it being preferred to conserve time in the operation of the machine by starting at an elevation or pressure which will not be too far above the average expected range of pressures, instead of otherwise prolonging the testing period for the sake of reading occasional pressures above 200 mm. Hg.

When the aforesaid pressure of 200 mm. is reached, the branch conduits 58a and 58b wi'l automatically be closed off from the rest of the system by action of back pressure on a bellows valve 75 interposed between condu't 58 and said branches. This makes the branches 58a and 58b, including the manometer 65 and wrist cushion 29, a closed system, in which the pressure is now gradually to be reduced until blood flow is resumed.

Meanwhile, a relay B will have been energized from battery source 61 via conductor 76 and bellows switch contacts 88 to one terminal 77 of the relay co'l, and via conductor 78 from the other coil terminal to junction 79 with the common ground wire 45. This energization of relay B is occasioned by closure of a bellows cutout switch 88, by action of its bellows 81 in expanding from air pressure within conduit 58 through branch 58C, causing means 82a on bellows rod 82 to engage and close switch 88 when a predetermined pressure, say 200 mm. of mercury, has been reached. The object of this is to provide a means for shutting off the machine automatically should the patron withdraw his wrist from the tourniquet for any reason before the machine completes its normal operat'on cycle. Such withdrawal would cause a drop in back pressure sufficient to affect bellows 81 and open switch 88.

As a consequence of energization and pulling up of relay B by closure of the cutout bellows switch as aforesaid, certain circuits are set up, of which one is a secondary or substitute holding circuit for relay A, for it will be appreciated that as soon as relay B pulls up, normal contacts 48 thereof will open, thus breaking the original holding circuit to ground 45 for relay A.

However, by reason of the existence of pressure in conduit branch 58a, a sensitive pulse bellows 85, interposed between conduit 58a and conduit 31, makes an init'al expanding movement to move plunger 86 outwardly (to the left), moving a contact 80b against contact 80a and thereby connecting conductor 47 (now locked with the coil of relay A) to ground via a secondary or substitute path or conductor 89 to ground 45 at junction 90. Thus, relay A continues to hold up despite energization of relay B.

Relay B, now energized, connects a set of sensitive pulse detector relays S and D (systolic and diastolic) for operation under control of the pulse bellows 85, by connecting power source 91 through contacts 92 of relay B and conductor 93 to the central or movable spring contact 94 on a reset cam switch 95.

An offset end 94a on contact 94 rides against the periphery of a reset cam 96 driven impositively through a slippable friction drive connection (not shown, but generally described hereinafter) with pump motor shaft 56. The periphery of reset cam 96 is notched or relieved as at 96a (on diametrically opposite sides of the cam in this instance), so that the offset 94a drops into this relieved portion during part of the rotative movement of the cam and causes contact 94 to engage a companion contact 98, which connects via conductor 99 to juncture 100 leading to one of the commonly connected terminals of each of the sensitive relay coils S and D; when the offset 94a rides out of the notch on the rim of the cam, contact 94 closes with a companion contact 97 which connects to the d'al clutch coil 170 via the contacts 174, 196, closed, on relay C, when the latter is energized at a later time for the purpose of determining the pulse rate. Normally, the reset cam switch is stopped by pawl 104 with sensitive relay circuit contact 94—98 closed so that relays S and D may operate.

The remaining terminal of sensitive relay coil S connects to its own movable contact 101 and to a stationary contact 102 on a detector switch actuated by pulse bellows 85, which operates, through its stem 86, a movable contact arm 103, connected via conductor 89 to the common ground at junction 90.

Thus, an increase in pressure, as by a systolic arterial pulsation, in the tourniquet, would cause bellows 85 to expand and urge rod 86 to carry detector contact 103 against co..tact 102 thus energizing systolic relay S, provided cam switch contacts 94—98 were closed, which they normally are because reset cam 96 is restrained against movement by a stop arm or pawl 104 which normally engages in the relieved portion 96a and prevents rotation of the cam from the normally arrested position shown, owing to the fact that the driving connection between the cam and motor shaft is only frictional and can be overcome by a stopping force such as applied by pawl 104.

When the systolic relay is energized as aforesaid by a systolic pulse, its movable contact 101 locks an operating or holding circuit therefor through contact 105 to ground via conductor 89 and junction 90. Movable contact 101 also connects this common ground to a movable contact 106 on the diastolic relay D via systolic relay contact 105 and jumper conductor 108, which relay D, upon pulling up, connects this ground through diastolic stationary contact 109 to the diastolic relay coil to provide a holding or locking circuit therefor, just as was done by the systolic relay.

But the diastolic relay is only energized in the first instance by the detector switch in response to the sensing of a diastolic pulse by tourniquet pad 29, causing a relative collapse of bellows 85 to withdraw rod 86 and carry detector switch contact 103 against a stationary contact 111, thus connecting common ground from conductor 89 through conductor 112, contact 107, systolic relay contact 101, conductor 108, diastolic relay contact 106, connection 112a to the coil D, which, as heretofore explained, attracts its movable contact 108 against contact 109 to hold coil D in energized condition.

It is apparent now that systolic and diastolic arterial pulsations vary the pressure correspondingly in pad 29, and in turn in bellows 85, to move detector switch contact 103 back and forth to energize first the systolic sensitive relay S and then the diastolic relay D; and that both of these relays remain energized until released by reset means to be described hereinafter.

However, if the pressure applied by the tourniquet is sufficient to occlude the flow of blood in the artery to which such pressure is applied by tourniquet pad 29, there can be no pulses to be detected.

If now the pressure in the closed pressure system can be reduced to a point where the arterial tension or pressure is sufficient just to overcome or overbalance the artificial or extraneous pressure applied by the tourniquet and associated means, then the measured pressure existing in the closed system, at the time such balance is struck, will be a measure of the systolic blood pressure. The pressure existing in the closed system at the time such balance is effected will be indicated by the manometer 65 so that the blood pressure may be read directly therefrom.

Means for decreasing the applied artificial pressure in steps, includes a measuring conduit 115, which connects at one end through a bleeder solenoid valve 116 to branch 58b of the air pressure line, which bleeder valve is normally closed; while the opposite end of the short measuring conduit opens into the atmosphere through an electromagnetic bleeder escape valve 117.

The capacity of the measuring conduit 115 is predetermined to an amount equivalent to a change in pressure in the closed system of about four millimeters of mercury. Thus, if the bleeder valves 116 and 117 are alternately opened and closed, the pressure in the closed system may be reduced in steps of four millimeters for each complete operation of these bleeder valves.

Alternate opening and closing of the bleeder or reducing valve means is effected by a bleeder cam switch (middle right of Fig. 1) having a central contact 118 connected via a conductor 122 to ground 119 through a normal contact 120 and movable contact 121 on a relay C.

The aforesaid bleeder cam switch contact 118 is moved alternately into and out of engagement with companion contacts 118a and 118b by a revolving star cam 123 on a shaft 124 which is driven slowly through a clockwork gear 125 from a timer motor 126, which motor runs constantly (while relay A is energized) from power source or battery 127 by a connection 128 with the common ground 45 from contacts 43 of relay A when the latter is energized as aforesaid.

Thus, while contact 118 is engaged with contact 118b as shown in Fig. 1, circuit is completed via conductor 118bx to energize the coil 129 of electromagnetic bleeder valve 117 from battery 121, thus closing the latter valve, while valve 116 remains open, so that measuring conduit 115 fills to capacity. As the star wheel 123 brings the next tooth to bear up fully under contact 118, the latter will engage contact 118a and close circuit via conductor 118ax to energize the coil 130 of valve 116 from battery 131.

The spacing of the teeth on star wheel 123 is such that bleeder valve 117 is held closed for several seconds, giving a safe margin of time for valve 116 to open and close.

Step by step reduction of the occluding pressure will be effected as aforesaid until a pulsation is detected by the detecting means 29—85—103, etc. The first systolic pulsation causes sensitive relay S to pull up and hold; the next succeeding diastolic pulsation will cause sensitive relay D to pull up and hold, and, moreover, to actuate a resetting means by closing a diastolic relay contact 134 with contact 135, thus placing power from battery 136 via conductor 137 on cam release coil 138 to energize the latter and withdraw stopping pawl 104 from the reset cam 96, so that the latter is freed to rotate.

So soon as cam 96 rotates as aforesaid, reset cam switch contact 94 is disengaged from contact 98, breaking the holding circuit via conductor 99 to both the systolic and diastolic sensitive relay coils S and D, freeing the latter for operative response to the next systolic and diastolic pulses, of which there must be a plurality, preferably five, before the pressure reading may be considered to have been reached.

The plurality of required pulses is considered a test to assure that actual resumption of blood flow has occurred, rather than an initial breakthrough and/or a possible false pulsation caused by an involuntary muscular twitch or casual movement of the patron at the wrong instant.

As an incident to each operation of the diastolic relay D in testing as aforesaid for a plurality of pulses, power is connected from battery 136 via diastolic contacts 134—135 to conductor 137, not only to operate the cam switch release coil 138, but also to energize a step-up coil 140 for a commutating switch including a common shaft 141 rotatively moved by a ratchet gear 142 responsive to reciprocation of a pawl 143 actuated in a known manner by step-up coil 140.

Such step-up switches being commonly understood in the arts, the same are not described in greater detail here, beyond observing that a resetting coil spring 144 is tensioned by the rotative stepping movement of the shaft as aforesaid, although retrograde movement of the shaft by the spring is normally prevented by a holding pawl 145 normally engaged in the teeth of ratchet disc 142 but withdrawable therefrom by energization of its release reset coil 146.

Thus, each detected diastolic pulsation causes the commutator shaft 141 to rotate or advance (clockwise) one step from the normal reset position shown in Fig. 1, carrying with it the several commutator switch wipers including wiper 72 on contact bank #1, as well as wiper 147 on contact bank #4.

The first two, as well as the fifth, contact button, on switch bank #4 are connected by conductor 148 and junction 149, via conductor 150 to the step-up coil 140, for which circuit is completed via juncture 151 to common ground 45, and the first two systolic and accompanying diastolic pulses, therefore, will cause the commutator wipers to advance two steps from starting position, which has the effect of carrying wipers 72 and 147 off their first two respective contact buttons to third position, as a result of which the manometer solenoid valve 66 is released (at contacts 70) to close and hold the mercury level at the position reached at the time the pulses were detected as aforesaid.

Because wiper 147 on bank #4 reaches a dead button, no further advances are made through this bank, but control for advancing or stepping the commutator switch is now shifted to contact bank #3, attention being called to the fact that a wiper contact 153 will now also be at its third position on a contact 154 which connects with juncture 149 and conductor 150 to the step-up coil.

Having taken two steps as aforesaid, the commutator switch will take a third step under control of the bleeder cam switch and bank #3, circuit being closed via contacts 118, 118a, conductors 118ax, 155 to wiper 153, bank #3, and contact 154 via conductor 150 to the step-up coil, causing ratchet 142 to be advanced another step, thus carrying wiper 147 to fourth position on contact 156, bank #4.

Simultaneously with the aforesaid third step, the bleeder cam switch will also have caused an operation of bleeder valve 116, but this will be of no effect, since the manometer valve 66 is closed so long as wiper 72 on bank #1 is on dead contacts in positions three to six.

Accordingly, stepping control of the commutator switch is again shifted back to bank #4, fourth contact 156, so that if a third pulsation now actuates diastolic relay D to close its switch 134—135, the step-up coil 140 will again be energized via conductor 137, wiper 147, its fourth contact 156 and conductor 150, causing ratchet wheel 142 to rotate another step so that shaft 141 carries all wipers to fifth position, wiper 147 in particular lodging upon its fifth contact button 157, so that the next complete pulsation to actuate the diastolic relay D will cause the commutator switch to take still another step through similar circuit connections involved in the preceding step (except that contact 157 is involved instead of 156).

A fifth and final step will be taken by the commutator switch under control of the bleeder cam switch owing to the presence of wiper 153 on the sixth contact button 158 of bank #3, which energizes the step up coil via cam switch contacts 118—118a, conductor 118ax, conductor 155, wiper 153, sixth contact button 158, and conductor 150 to step up coil 140. This carries all contact wipers to seventh and last position.

As an incident to the foregoing movement of the commutator wipers to last or seventh position, wiper 72 lodges upon last contact 71 of bank #1 and thereby completes circuit via conductor 71a to one terminal of the coil 159 of a relay C, the energizing circuit through which is completed via conductor 76 and safety or supervisory switch 88 to grounded battery 61, wiper 72 being grounded via conductor 73 to the common ground 45. The machine is now ready to proceed with the ascertainment of the pulse rate.

In the foregoing operation of the machine, the requisite number of pulses was detected during the testing interval without necessitating a further drop in the applied pressure; but means is also provided for effecting such a further adjustment or drop in the applied pressure if the requisite number of pulses is not detected, and before proceeding with a description of the pulse-rate ascertaining mechanism the adjusting means will now be described.

Assume, for example that one false pulsation causes an operation of the detector switch and associated sensitive relays S and D; contacts 134 and 135 on diastolic relay D would then advance the commutator switch one step via wiper 147 and the first of the first two contacts 147a thereof to energize step-up coil 140 once. But assume further that no pulses succeeded this false pulsation, then in such a case, the rate of turning of the star cam 123 on the bleeder switch is such that there is time for at least two systolic and accompanying diastolic pulses to occur between successive operations of bleeder cam contacts 118, 118a, 118b, in consequence of which (if no additional pulses are detected after the first assumedly false one) the commutator switch will be reset to its starting position by the following circuit:

From one terminal of reset coil 146 via conductor 160, wiper 161 and any of the looped contacts from the second to the seventh contacts numbered 162 as a group on bank #2, via conductor 163 to contact 164 on relay C and its normal contact 165, to the common ground 45 at juncture 166; and from the other terminal of reset coil 146 and its battery 146a via conductors 167 and 168 to the second contact 169 on bank #3, thence via its wiper 153 and conductor 155 to conductor 118ax, through bleeder cam switch contacts 118a—118, conductor 122, normal contact 121 on relay C, and its contact 120 to ground 119, thus causing reset coil 146 to be energized to raise holding pawl 145 from ratchet wheel 142, permitting spring 144 to return shaft 141 and all wipers to starting position.

Under the foregoing circumstances, bleeder valves 116 and 117 will again be actuated by the bleeder cam switch, and one or the other of the foregoing advancing or resetting operations of the commutator switch may occur, depending upon whether or not the requisite succession of true pulses is detected.

In passing, it will be observed that the looped group of resetting contacts 162 on bank #2 are situated on all positions from the second to the last or seventh, so that should there be several false pulsations detected in succession, but not followed by additional pulses in the testing interval between successive operations of the bleeder cam switch by the timed movement of the star cam 123, then there will be a resetting operation such as heretofore described.

In short, the downward adjustment of the applied pressure will continue under control of the bleeder cam switch unless a certain number of true pulsations is detected in the interval between successive operations of said bleeder cam switch.

For example: the first two pulses energize the step-up coil through the first two contact buttons on bank #4 and the diastolic relay contacts 134—135; there then follows a measured lapsed-time interval during which the bleeder cam switch operates the commutator one step, instead of the diastolic relay; this enlarges the time interval during which the effects of false pulsations, caused by bodily movements or muscular twitches, are given an opportunity to subside in the possible event that true pulses may nevertheless be present.

At the conclusion of the lapsed-time interval, control of the commutator switch is transferred back to the sensitive relays, but if no further pulses follow, there will be a resetting of the commutator switch, such as has been heretofore described, with a further downward adjustment of the applied pressure.

From the foregoing description, it will appear normally impossible as a practical matter for a succession of false pulsations, from deliberate or involuntary movements of the patron, to procure what would amount to a false pressure reading provided the patron does not attempt willfully to procure false operation. The time interval during which the foregoing test for a succession of pulses occurs, and the interval allowed for the appearance or detection of succeeding pulsations is calculated on the basis of actual experience to provide an adequate margin to assure proper operation of the machine in all normal tests. If needs be, of course, the testing period and particularly, the number and order of successive pulses required, can readily be extended to discourage even deliberate misconduct by the patron, as by multiplying the testing steps of the commutator switch. Such measures are not required at all, however, for the serious and normally intended operation of the machine.

*Pule rate ascertaining means*

Assuming now, that the necessary number of pulses has been detected to carry the commutator switch to seventh and last position, relay C will be energized via contact 71, as heretofore described, and the pulse rate will then be ascertained, the pulse rate dial having been conditioned for this purpose when the machine first begins its operation.

When the patron deposits a coin to operate coin switch 35 and start the machine, clutch coil 170 is energized through a connection at 171 with the common ground wire 45, via conductor 172 to the coil and thence via conductor 173 to contact 174 on relay C which connects through its normal contact 175 and conductor 176 through normally closed dial switch contacts 177 to battery 178, so that holding pawl 179 is withdrawn from the dial clutch disc 180, freeing the latter to turn through a slip clutch arrangement 181 (Figs. 4 and 5 also) driven by constantly rotating shaft 124.

This release of the clutch disc causes the pulse rate dial 182 to rotate as well, and such rotation continues until the index mark or pointer 183 is restored to an approaching position slightly in advance of true starting or zero position, at which time a pin 184 on the clutch disc will engage one of the dial locating switch contacts 177 and separate it from the other to break circuit to the clutch coil 170, thus allowing pawl 179 to fall back again into the teeth on the clutch disc and restrain the latter against further rotation at this time.

As a further incident to the initial release of the clutch disc as aforesaid, a master cam 195 to be described more fully later also rotates a short distance until a notch 196b (see Fig. 5) thereon engages a brake pawl 216 to arrest the master cam while the pulse rate dial continues on toward near-zero position. With the master cam thus arrested, offset 40a rests in the deeper notch portion 196a with contacts 40 closed to actuate the clutch release coil 170 for a brief interval later when relay C first pulls up.

In the meantime, the pressure system receives air from the pumps, and the previously described steps in ascertaining the blood pressure are going forward, the pulse rate dial merely being rotated toward starting position as aforesaid to save time in the interim. Having approached nearly to starting position, dial switch 177 opens to stop the dial until such time as the pressure test is concluded and the pulse test is to proceed, as determined by ultimate operation of relay C in the manner heretofore described.

When relay C pulls up, its contact 174 engages a make contact 190 which connects clutch coil 170 via conductor 191 to contact 97 on the pump motor reset cam switch, so that every time the latter is actuated by energization of its release coil 138, the clutch coil 170 will attract and withdraw the holding pawl 179 to free the pulse rate dial 182 for rotative movement for a brief measured interval before reset cam switch contacts 94—97 again break circuit and pawl 179 falls back ready for another release. The pulse rate dial may move approximately twelve degrees of arc in the measured interval suggested.

It will be observed again that one terminal of the reset cam switch release coil 138 is connected to the common ground 45 at 90 while the other terminal connects via conductor 137 at 137a to diastolic relay contact 134. Thus, for every systolic and attendant diastolic pulsation detected to operate sensitive relays S and D (provided relay C is energized), the cam switch release coil 138 will be operated to momentarily release the clutch pawl 179 of the pulse rate dial and to reset the sensitive relays in readiness for the next pulsations. Each true diastole is, therefore, counted as the pulse.

In order to express the pulses in terms of the customary rate per minute without keeping the patron too long at the machine, the pulse rate dial 182 is calibrated in terms of pulses per minute; and timing means is provided for maintaining the pulse testing connections for a predetermined period less than a minute, for example twenty seconds, the movements of the pulse dial upon each release of the clutch pawl 179 being correlated to the aforesaid calibration of the dial in a ratio of three to one.

To this end, there is mounted on timer shaft 124 a master cam 195 with a peripherally notched or relieved portion 196 (see also Fig. 5) in which rides the offset nose 40a of one of the two dial starting contacts 40.

On the master cam 195 is an adjustable stopping projection or nose 197 positioned to engage and raise the offset riding end 40a and cause the contact spring of which it is a part to bear up against an insulating pin 197x and a main stopping contact 198, which is normally closed with its companion contact 199 to provide the ground connection 41 which permits relay A to remain locked in operated condition, at the start of the cycle of operation.

As the stopping nose 197 on master cam fully raises stopping contact 198 out of engagement with contact 199, this holding circuit for relay A is momentarily broken, thus causing relay A to drop back to normal de-energized condition, thus breaking the main common ground connection 45 for all circuits, with the result that the machine stops preparatory to another cycle of operation.

The momentum of the timer motor 126 and associated parts is sufficient to carry the stopping nose 197 beyond the stopping switch offset 40a, so that the latter may again complete its ground circuit 41 for battery or power source 38 in order that relay A may again be actuated by deposit of a coin.

At the initiation of each cycle of operation of the machine, it is necessary to reset the commutator switch, which is usually left standing at seventh position at the time the machine shuts off by breaking of the holding or locking circuit for relay A; and such resetting is accomplished actually by relay A in placing ground on the common or main ground conductor 45 through contacts 43 and juncture 46.

The commutator switch reset coil is in readiness to be energized the moment relay A pulls up, because normal contacts 164—165 on relay C, conductor 163, the seventh contact on group 162, wiper 161 (bank #2) and conductor 160, establish an operating ground for reset battery 146a at once and this circuit is completed through normal contacts 200 on relay B and conductor 168 as soon as relay A pulls up upon deposit of a coin, thus energizing reset coil 146 to restore the commutator switch to first position.

As heretofore mentioned, clutch coil 170 is energized until the dial stop switch 177 is opened by pin 184 as the pulse rate dial approaches zero or starting position when the machine is set into operation.

In order to move the pulse rate dial index 183 fully into starting or full zero position when relay C finally pulls up at the concusion of the pressure-ascertaining phase of the cycle, clutch coil 170 is again momentarily energized from battery 38 through master cam contacts 40 via conductor 201 to juncture 202 and contacts 174—190 on relay C, thence via conductor 173 to the clutch coil.

In the short interval during which offset 40a rides from the end (right) of the deeper notch portion 196 onto the shallower notch portion 196a, the pulse dial moves far enough to align its index or pointer 183 at actual zero or starting position, before contacts 40 open when offset 40a rides fully onto the shallow notch portion 196a to break circuit to the clutch coil and stop the indicator dial 182.

In order to accurately zeroize or rectify the dial control means at the start of each cycle so that the pulse rate dial and associated master cam parts will positively start in step from a true zero position, the master cam is impositively driven through a slip-clutch connection 205 (Fig. 5) consisting preferably of a felt washer 206 and a metal washer 207 which bears against the star cam 123 by virtue of the effort of a spring 208 compressed between the pin 212 near the pulse rate dial 182 (Fig. 4) and the dial clutch disc 180, to urge additional metal and felt washers 209, 210, against disc 180, which disc is fast with the dial 182 through connecting pins 211 respectively screwed and riveted or otherwise fixed to the dial 182 and disc 180, spring 208 pressing against pin 212 on the left-hand extension of shaft 124, whereas dial 182 is free to slide axially on shaft 124, as is clutch disc 180 and master cam 195. Therefore, spring 208 normally urges the clutch disc toward the right.

Thus, spring 208 causes clutch disc 180 to bear against alternate metal and felt washers or analogous means, 181a, 181b, 181c respectively, constituting the slip clutch 181, thence against master cam 195, which in turn bears against star cam 123 through slip-clutch washers 206, 207, the star cam being fast on shaft 124 by setting of set screw 211. Friction through the felt washers and other washers 209, 210, 181a, 181b, 181c, 206, 207, under pressure of spring 208, causes the dial and disc as well as the master cam 195 to rotate with shaft 124 when not restrained by a force adequate to overcome said friction and the effort of spring 208.

Normally clutch disc 180 is restrained against movement by engagement of pawl 179 in the teeth thereof; notwithstanding, however, shaft 124 continues to rotate, and if nothing restrains the master cam 195, it too will rotate.

Master cam 195 is itself normally restrained, however, by a brake pawl 215 having an offset 216 which rides on the edge of the cam and is engaged by shoulder 196b at the trailing end of the shallower notch 196a, thereby to hold the cam against movement.

The brake pawl 215 is lifted from holding engagement with the master cam by a pin 217 on dial clutch disc 180 as the latter makes its final short movement into actual zero position, as heretofore explained, under control of relay C and contacts 40.

In this manner, master cam 195 is positively held at an arbitrary starting position while the pulse rate dial 182 is rotated into a corresponding position, with the result that when the clutch coil 170 is energized, as by pulses to be counted, the dial and master cam will start together, it being recalled that the time of shaft 124 is calculated to bring switch 198—199 in twenty seconds, whereas the dial 182 is adapted to be calibrated in terms of a full sixty seconds or one minute, so that it is important that the control cam and the dial start and remain in step from a true zero position, regardless of where the dial happens to come to rest when the cycle is ended.

The stopping nose or projection 197 is adjustable by virtue of a set screw 197a passing through a concentric slot 197b therein to locate the stop accurately so far as opening of stop switch 198—199 is concerned.

*Pulse detector switch*

In Figs. 6, 7, and 8 are shown details of the sensitive switch utilized for actuation by the relatively feeble displacements in the closed air pressure system responsive to the transmission of arterial pulses into the cushion 29.

As viewed in Fig. 7, the bellows 85 is mounted on a suitable panel 85a of insulation upon which are provided posts 85b to mount a cover, not shown. The bellows consists of a housing 85c in which is disposed the metal bellows 85d, (see Fig. 8) of known form. An inlet 85e connects with conduit 58a of the pressure line, while an outlet 85f connects to conduit 31 leading to the wrist tourniquet or cushion 29.

Projecting from the bellows so as to move back and forth therewith, is the bellows rod 86, which passes freely through mounting panel 85a to the opposite side for cooperation with the switch contacts 102, 103, 111.

As illustrated in Fig. 1, contact 103 is, properly speaking, the movable contact, although in the novel construction disclosed in detail in Figs. 6 to 8, contact 102 is also movable for purposes of automatic compensation and adjustment.

Contact 103 is an elongated strip of metal such as copper, with an applique-contact area 103a of conductive but non-corroding alloy. One end 103b is offset laterally and rests in a slotted bracket 103c for rocking movement laterally of the long axis of the strip, which is provided with an over-size hole 103d (Fig. 8) for passage of the bellows rod 86, upon which contact strip 103 normally rests with sufficient frictional bearing to assure that the contact strip will move back and forth with the rod responsive to pressure variations in the bellows housing.

Contact 111 is threaded into a cleat 111c attached to panel 85a, and is provided with a conductive non-corroding contact point 111a situated to engage contact area 103a, and is further provided with setting nut 111a.

Contact 102 likewise is an elongated metal strip provided with contact point 102a opposite the contact area 103a on the main movable contact. The left end of contact strip 102 projects into a slot in a guide bracket 102b on panel 85a so as to maintain contact point 102a in alignment with contact area 103a on the main movable contact while permitting some freedom of lateral movement of self-adjusting contact 102.

The opposite or right end of contact strip 102 has riveted thereto as at 102c an insulating plate 102d having a hole 102e to receive the end portion of bellows rod 86, through which is passed cotter pin means 86a retaining the contacts thereon.

Safety switch 80, heretofore described in view of Fig. 1, consists of a contact spring or leaf 80a (Fig. 8) and a normally open companion contact 80b with its right-hand extremity disposed in the path of movement of insulating plate 102d so as to be engaged and moved by the latter into circuit-closing engagement with contact 80a upon outward or expansive (toward the right, Fig. 8) movement of the bellows rod 86, whereby to close a circuit, as via conductor 76 in Fig. 1 to set up a supervisory ground circuit for relay A.

A third leaf-spring 80c, utilized as a stop, is mounted in the stack along with contacts 80a and 80b between the usual insulating wafers 80d, and has an angled end 80e disposed to be engaged by insulating plate 102e to limit outward movement of the latter and hence of both contacts 102 and 103, thus causing bellows rod 86 to be projected positively beyond its inner limit with respect to the two contacts 102, 103, upon initial expansion of the bellows when the pressure system is inflated.

This assures that both advancing and retracting movement of rod 86 will find both contacts 102 and 103 freely resting thereon for movement back and forth therewith.

An important feature of self-adjusting contact 102 resides in the position of hole 102e with respect to the true fulcrum therefor, which happens to be the bracket 102b, thus making a relatively long lever of contact 102, which means that said contact 102 makes only negligible movement responsive to normal pulsations of bellows rod 86.

In contrast to the long fulcrum of contact 102, contact 103 has its mounting hole 103d situated much closer to the true fulcrum thereof, namely, bracket 103c, with the result that slight pulsating movements of bellows rod 86 causes much greater displacement or amplitude of swing of contact 103, compared with contact 102.

Actually, the movement imparted to contact 103 by the bellows 85 is very slight, the clearance between contact 103 and contact 111, for example, being a matter of only two or three one-thousandths of an inch. Obviously, some pulses are stronger than others, and the patron may make numerous involuntary muscular movements while undergoing test, with the result, that at one movement contact 103 may move only a few thousandths of an inch to make and break contact, while, at the next movement contact 103 may be violently displaced by a strong thrust on bellows rod 86 corresponding to a movement of the patron's wrist in the tourniquet, which might be sufficient either to cause rupture of the switch parts or to upset any fine adjustment of the contacts.

However, the foregoing switch structure compensates automatically for all operating variations resulting from irregular movements of the bellows rod, while maintaining the necessary fine adjustment to respond to strong and weak pulses, alike.

Because of the impositive driving connection between rod 86 and contact 103, the rod may assume any necessary advance or projected position notwithstanding the limited freedom of movement of contact 103; yet, slight movements of the rod 86, once such advanced positions thereof are assumed, will effect the corresponding actuation of contact 103.

If the pulses are weak, self-adjusting contact 102 will make practically no movement relative to contact area 103a; such adjustment being relatively fine as to clearances; but should the pulses be unusually strong, there would be a corresponding adjusting differential displacement of contact 102 tending to widen the gap between contact parts 102a and 103a, to prevent false pulses from actuating the sensitive relays. Thus, fine compensating movements are possible because of the differential self-adjusting movements of these contacts. It may be observed that the switch unit is mounted in the position shown in Fig. 6.

Repeat operation feature

It sometimes happens, especially with persons having a normally weak pulse or some arythmic peculiarity that the pulse is detected for a few beats, and then lost for the next few beats, and in such cases, as well as in those instances where involuntary movements of muscles or the wrist occur, poor readings may result if the irregularity occurs at a critical instant, as at the end of the five-beat test, or during the pulse counting period; and in those cases, as described, where the machine is coin-controlled, it is desirable to give the patron a "repeat" or second test.

To this end, means, such as a light, is provided to notify the patron if the pulse count does not exceed a predetermined value, preferably 34, and to automatically condition the machine for a second cycle without deposit of a coin.

Referring again to Fig. 1, it will be observed that on the bottom of the pulse rate dial there is shown a long peripheral rise 250 extending from adjacent the index or zero point 183 to a point about one-quarter the way around the rim of the dial which is in fact to a point opposite a pulse rate reading of 34, this dial being numbered in substantially the manner illustrated in our aforementioned patent. A repeat-operating dial switch 251 has an offset which rides along rise 250 and causes the repeat switch to remain closed between pulse readings of zero and 34.

If the machine should stop at the end of the twenty-second pulse testing period without registering a pulse above 34, a repeat circuit will be automatically set up as soon as relay A falls back, so that by pushing a manual repeat button 252, the machine will be started again for a second complete cycle.

As soon as relay A falls back relay RH pulls up and locks at contact 261, and, a repeat light 253 (upper left, Fig. 1) will be illuminated from battery 254 via a ground circuit under control of repeat holding relay RH and particularly contacts 255—256 thereof, through normally closed contacts 257 on a bi-metal thermostatic or other time delay switch, which includes a heater or actuating element 258 in parallel with the winding of the repeat holding relay via conductors 259, so that the heater is energized as soon as repeat holding relay RH is energized.

The ground circuit for the repeat light, and in fact for the repeat holding relay and a repeat locking relay (presently to be described) is completed via conductor 260 through closed repeat dial switch 251, and conductor 261 to normal contact 262 on relay A, which contact also illuminates an attention or advertising lamp 263 when the machine is idle. Thus, as long as relay A is holding up, the repeat ground circuit via conductors 260—261 is broken, but is made as soon as relay A drops back, as when the machine shuts off. This repeat ground circuit, however, will be made only if the repeat dial switch 251 is closed with a pulse reading of 34 or less.

Repeat light 253 is illuminated by energization of repeat holding relay RH, which pulls up simultaneously with a reat locking relay RL, because both relays receive power from battery 254 via ground through normal contact 264 and locking contact 265 of relay RL; but this latter ground is broken as soon as relay RL pulls up, and remains broken until a coin is again deposited, owing to the provision of a spring detent or locking pawl 266 under which the attracted locking contact 265 is held mechanically until the pawl is released.

The repeat holding relay, however, makes its own holding circuit via its contacts 267 through the dial repeat switch ground connection 260; and this holding circuit will continue until the time delay or thermostatic switch contacts 257 break after an interval of approximately one-half minute during which the patron may push the repeat button 252 upon being apprised by illumination of the repeat light 253, and associated instructions, of the advisability of so-doing.

Repeat holding relay RH sets up a circuit from ground via its contacts 255—256 to the make contact 267 on the push button switch, thence via the movable contact 268 of the push button switch, when the latter is operated for a repeat test, and via conductor 269 to normal contact 270 on relay A, which is the same contact to which the coin switch 35 connects the starting ground via conductor 36, so that operation of the repeat push button results in energization of relay A without use of a coin, provided the pulse does not read higher than 34.

With relay A thus again operated, the machine will repeat the usual cycle of operation, with the difference that should the pulse rate again fail to exceed 34, no further free tests may be had, because movable locking contact 265 of the repeat holding relay RH is locked beneath pawl 266 and hence there is no ground connection for relay RH or the parallel-connected repeat locking relay RL.

Only by deposit of another coin can the repeat circuit be conditioned for further operation, and this is effected by energization of a coin release coil CR via conductor 271 and normal contact 272 on the repeat push button switch, thence via conductor 269 to normal contact 270 on relay A, which receives a momentary ground when coin switch 35 is operated. The coin release coil withdraws the pawl 266 from locking position so that locking contact 265 may fall back. The repeat holding relay RH is released after a half-minute by operation of the thermostatic switch 257—258 to extinguish the repeat light and disable the repeat connections to the push button switch in those cases where the patron does not avail himself of the free operation.

Summary of operation

The patron inserts his wrist in the tourniquet 20, tightens strap 22, and deposits a coin to close coin switch 35, whereupon relay A pulls up and locks, extinguishing the advertising light 263.

Energization of relay A sets up a power circuit by connecting ground to the common ground wire 45, and at once the pump motor 50 starts, vent valve 59 closes, and timer motor 126 starts. Also dial clutch coil 170 becomes energized from power source 178 to permit the pulse dial to closely approach (without reaching) zero position until pin 184 opens the dial locating switch 177, breaking circuit to the clutch coil and battery 178 and stopping the dial index 183 just ahead of zero position.

While the pulse rate disc is being brought around toward starting position, the master cam 195 moves a short distance until stopped by its brake pawl 215 in the starting position shown in Fig. 1 with the offset 40a of a contact 40 in readiness to ride onto notch portion 196a and break contacts 40 to stop the dial exactly at zero position.

As another incident to the pulling up of relay A, the commutator switch is restored to zero position by energization of its reset coil 146 via wiper 153 and the seventh contact on bank #2.

Meanwhile air pressure is built up in reservoir 57 and the associated conduit system, and as soon as a pressure of about 200 mm. Hg is reached, bellows 81 closes cutout switch 88 to energize relay B and connect relay C for subsequent operation. Also, the wrist bag or cushion 29 is inflated to press firmly against the volar aspect of the wrist, while the rising pressure is indicated by the mercury manometer 65, since its valve 66 is opened at once by restoration of wiper 72 to first position in bank #1.

When the pressure reaches about 200 mm. Hg, the back pressure bellows 75 closes and makes the conduits 58a, 58b, including the tourniquet and manometer, a closed pressure system. This predetermined elevated or maximum pressure of 200 mm. Hg is sufficient to occlude the blood flow in the brachial artery of most subjects.

The maximum or occluding pressure is now gradually reduced in steps of about 4 mm. by alternate opening and closing of bleeder valves 116 and 117 to admit and release measured quantities of air to and from the measuring means or short conduit 115.

Such gradual reduction of pressure in the closed system, and particularly the wrist tourniquet continues until the blood flow is resumed and arterial pulses alternately increase and decrease the pressure in the wrist tourniquet to operate the pulse bellows 85 and move the detector switch contact 103 back and forth.

Each systolic pulsation causes detector switch contact 103 to energize systolic relay S via contact 102, which relay becomes locked and sets up an operating circuit for the diastolic relay, while each diastolic pulsation causes diastolic relay D to be energized and locked via contacts 111 and 107. Diastolic relay D also causes release of the resetting cam switch 95 by energizing release coil 138 via contacts 134—135, withdrawing pawl 104 so that cam 96 may be rotated through a slip-clutch arrangement of washers (not seen) such as described in view of the slip clutch of Fig. 5.

Rotation of the reset cam 96 opens contacts 94—98 thus breaking the locking or holding circuits for the systolic and diastolic relays S and D to juncture 100.

Each complete systolic and diastolic pulse as aforesaid actuates a testing means, including the commutator switch, in order to ascertain if the pulses are successive and not merely random false pulses of one kind or another.

The first two successive pulses cause the commutator switch to step twice by energizing step-up coil 140 via diastolic relay contacts 134—135, wiper 147 and contacts 147a on bank #4. Then a third timing step is taken under the control of bleeder cam switch contacts 118—118a and wiper 153 and contact 154 of bank #3.

If two more successive pulses follow, the commutator switch takes two more steps by energization of its step up coil 140 via diastolic relay contacts 134—135, wiper 147 and contacts 156—157 on bank #4.

Should either of the first two or last two testing pulses fail to be detected, the commutator switch would be reset by energization of its reset coil 146 via the first two contacts 169 or fourth and fifth contacts on bank #3 and closing of contacts 118—118a on the bleeder switch.

Should the first two steps be taken, the manometer valve 66 would be closed to hold the mercury column because wiper 72 leaves contacts 70 on bank #1, but upon resetting of the commutator switch as aforesaid, the manometer valve would open again for further adjustment or reduction of pressure and a repetition of the testing operation.

Should the commutator take the necessary five steps without resetting, a final and sixth step would be taken under control of the bleeder switch and wiper 153 on contact 158 of bank on bank #3, thus bringing wiper 72 on the seventh and last contact 71 of bank #1 to energize relay C and start the pulse counting operation. Manometer valve 66 remains closed to hold the pressure reading at the systolic level. The pulse rate test then follows.

When relay C pulls up, clutch coil 170 is momentarily energized via contacts 174—190 on this relay and master cam contacts 40 so that the dial clutch disc 180, the pulse dial 182, and master cam 195 are freed to turn in step with the index pointer 183 on the pulse rate dial starting from zero position.

Systolic and diastolic pulses now actuate the detector switch as before with operation of systolic and diastolic relays S and D to open and close contacts 134—135, thus periodically releasing the reset cam switch means 96—104 with consequent corresponding energizations of the clutch release coil 170 via contacts 97—98, conductor 191 and contacts 174—190 of relay C, so that for each complete pulse the pulse rate dial moves one step during a twenty second testing interval determined by the transit of stopping nose 197 on the master cam to again open contacts 198—199, whereby the ground 41 for the holding circuit of relay A is broken, it being pointed out that this ground is quickly restored by carry-over of the master cam stop nose 197 past offset 40a on the stopping switch in order that a locking circuit may again be set upon for the next cycle of operation.

Should the pulse reading not exceed 34, the repeat switch 251 would remain closed, so that when relay A falls back as the machine shuts off, the repeat light 253 will light up and repeat locking relay RL will pull up and its contact 262 locks mechanically at 266 to prevent further free operations until another coin is deposited. Repeat holding relay RH pulls up simultaneously with relay RL and locks its own holding circuit at 267. The patron pushes repeat button 252 which connects ground from contact 43—262 on relay A, conductor 261 through the dial repeat switch 251, conductor 260, thermostatic switch contacts 257, repeat holding relay contacts 255—256, push button contacts 267—268, conductor 269 through normal contacts 42—270 on relay A to energize the latter, thus initiating another cycle of operation of the entire machine.

When the machine shuts off, the mercury column in the manometer, and the reading on the pulse dial stand until the next operation of the machine.

The foregoing description and illustrations are submitted as merely exemplary of one preferred arrangement and form of the invention, and means for effectuating the objects set forth; but it is expressly to be understood that no particular mode of connection or inter-connection of the various circuits is intended, except insofar as the appended claims may be specific thereto, it being understood further that modifications in such connections and in the form and mode of operation of the instrumentalities named, may be made without departing from the scope of the invention, and no limitations are intended except as specifically contemplated by the following claims.

We claim:

1. In a blood pressure apparatus, the combination with means for applying a variable pressure to an artery, of the following cooperating instrumentalities, namely: a single tourniquet connected with said pressure applying means and applicable in the region of an artery to exert a correspondingly variable testing pressure thereto, and pressure sensitive control means including counting mechanism operable in steps and cooperable with said tourniquet for actuation by pressure variations therein for controlling operation of said pressure applying means in accordance with the counting of a fixed succession of arterial pulsations and a fixed succession of intervening timed steps by said counting mechanism to arrest variation of said testing pressure.

2. In a blood pressure ascertaining apparatus, an inflatable tourniquet adapted to be applied to the wrist, means for inflating the tourniquet to occlude arterial blood flow, means for reducing the occluding pressure in steps of uniform volumetric measure, means cooperable with said tourniquet for detecting pulsations when the occluding pressure is reduced to permit resumption of blood flow, means for counting pulsations, and means for manifesting the pressure existing in said tourniquet at the time of said resumption as a measure of the blood pressure provided a series of pulses of plural number are counted in succession by said counting means.

3. In apparatus of the class described, in combination, a tourniquet and means cooperable therewith for applying a variable pressure to an artery, means actuated by pressure variations in said tourniquet, responsive to arterial pulses, for preventing a change in the applied pressure when a certain number of pressure variations are caused by arterial pulses as aforesaid in a certain sequence and within a certain time period timing switch means cooperable with said variable pressure applying means for controlling the limits of said period, and means for manifesting the value of the applied pressure at a time following the expiration of said time period.

4. In a blood pressure machine, in combination, a pneumatic wrist tourniquet, means for inflating the tourniquet to occlude arterial blood flow, means to reduce the pressure step-by-step from occluding value to permit resumption of blood flow, means for sensing arterial pulses upon resumption of said flow, and testing means including means requiring a certain number of operations for effecting shut-off of the machine and arranged to be operated partly under control of said sensing means and partly by a lapsed-time device in effecting the said required and certain number of operations to effect shut-off as aforesaid.

5. In a blood pressure ascertaining apparatus of the type which includes a source of fluid pressure, means for varying said pressure, and pressure-indicating means, the combination of the following instrumentalities: a fluid-inflated member connected with said source of pressure, means for securing the wrist in firm contact with said member, means controlling said varying means to cause a pressure in said member to occlude blood flow in an artery adjacent said wrist, and for further varying said pressure until blood flow is resumed in the artery, pressure-sensitive switch means connected with said inflatable member for actuation by pressure variations therein responsive to both systolic and diastolic arterial pulses, and means controlled by said switch means to prevent variation of pressure in the member by the varying means upon a predetermined number, greater than two, of operations of the switch means as aforesaid, the pressure indicated by said indicating means following said number of operations of the switch being a measure of systolic arterial tension.

6. Apparatus of the class described comprising, in combination, an inflatable unit wrist tourniquet, means for inflating said tourniquet with pressure sufficient to occlude blood flow in an adjacent artery, means for effecting step-by-step reduction of the occluding pressure until reactionary pressure variations are caused in the tourniquet by arterial pulsations, and means controlled by a given number of both diastolic and systolic reactionary variations occuring sequentially in groups separated by a measured time interval for causing either further reduction of the inflating pressure if the required reactionary pulsations do not occur as set forth, or cessation of reduction if the reactionary pulsations do occur as set forth, and means for indicating the degree of pressure in the tourniquet at the time of cessation as aforesaid.

7. In a blood pressure apparatus, in combination, an inflatable tourniquet adapted to be applied to the wrist, and a means for inflating the same to various pressures ranging between an occluding and a sub-diastolic value, and pressure-responsive detector means cooperating with said tourniquet for controlling said inflating means to adjust the pressure therein to a value equivalent to the tension in an artery under test in said tourniquet, means for testing for a succession of pulses, means for counting pulses detected by said detector means, means for automatically starting a counting operation by said counting means after said succession of pulses is detected, means for automatically stopping said counting means after a measured time interval, and means for exhibiting the total pulses counted in said interval.

8. In a blood pressure apparatus, including a source of fluid pressure and means of indicating the value of said pressure, the combination of a single tourniquet for application to the wrist and including a bag inflated by said pressure to occlude arterial blood flow, and sensing means arranged to be actuated by reactionary pressure variations in said bag responsive to arterial pulsations, together with means for varying said pressure, said sensing means being arranged to control said varying means to adjust the degree of said pressure in said bag until a certain number of pairs of a systolic and diastolic reactionary pulsations, have occurred in succession.

9. In apparatus of the class described including a tourniquet applicable to a body member and adapted to be tightened by fluid displacement therein, together with means cooperable with said tourniquet for ascertaining arterial tension, the combination of coin-controlled means to condition said apparatus for a cycle of operation to effect one complete ascertaining operation, and pressure-responsive means cooperable with said tourniquet for disconditioning said apparatus against further ascertaining operation until further coin-controlled operation of said conditioning means if said body member is withdrawn from said tourniquet after said cycle of operation has begun and before the same has been completed.

10. In cardiometric apparatus including pressure applying means adapted to receive a body member, and coin-controlled mechanism cooperating with said applying means and released by a coin for a cycle of operation to ascertain cardiometric data, the combination of pressure-sensitive means cooperable with said applying means to prevent completion of said cycle of operation after the commencement thereof upon withdrawal of said body member before completion of said cycle.

11. In a machine of the class described including apparatus actuated under coin control for a cycle of operation and body contacting means engageable with a body portion during said cycle, the combination of electrically-controlled means for preventing completion of said cycle if body contact is withdrawn after initiation of said cycle and before normal completion thereof, said last-mentioned means including a circuit control device for said electrical means and cooperable with said contacting means for actuation to cause operation of said preventing means, if body contact is withdrawn before completion of said cycle and without further coin operation of said coin-controlled means.

12. Apparatus of the class described comprising, in combination, an inflatable tourniquet applicable to the wrist, means for inflating said tourniquet to an occluding pressure, means for reducing the pressure in said tourniquet to a level below the occluding value, means actuated by pressure variations in said tourniquet occurring at or immediately below said occluding value for preventing reduction of the tourniquet pressure when a predetermined number of said last-mentioned variations have occurred, and means for counting the number of said last-mentioned variations occurring in a given period and manifesting the count in terms of pulse rate, together with means for manifesting the tourniquet pressure at least as of the time when said predetermined number of variations have occurred.

13. The combination set forth in claim 12 further characterized by the addition of coin-operated means for initiating operation of said apparatus in the manner therein set forth, and means conditioning the apparatus for a repeat operation without use of a coin when the pulse count does not exceed a given value.

14. In an apparatus of the class described, in combination, means for detecting arterial pulsations, means cooperating with said detecting means for ascertaining arterial tension, means for counting said pulsations in a predetermined period of time, coin-controlled means for setting apparatus in operation for the purposes set forth, and repeat operating means actuated in concert with said pulse-counting means for conditioning said apparatus for another operation as described without use of a coin whenever the pulse count is less than a certain value.

15. Apparatus of the class described comprising, in combination, an inflatable tourniquet and means for holding the same in engagement with the volar aspect of the wrist, means for inflating said tourniquet, means for reducing the tourniquet pressure in steps, means cooperable with said tourniquet for sensing pulses, means controlled by the sensing means for controlling said reducing means, means controlled by said sensing means for counting the number of pulses occuring in a given period, means for manifesting pressures in said tourniquet, and supervising control means for the foregoing means to effect the following order and sequence of operations, at least, namely: zeroizing said manifesting and counting means; increasing pressure in said tourniquet to an occluding value; step-by-step reduction of said pressure until a certain number of pulses is sensed; manifestation of the tourniquet pressure following sensing of said number of pulses; counting the pulses accruing in said period; deflecting said tourniquet.

16. The combination of claim 15 further characterized by the provision of additional supervisory control means in the nature of coin-operated means for initiating operation of the apparatus as set forth therein, and means for conditioning said apparatus for a repetition of said sequence of operations without the use of a coin if the pulse count fails to exceed a predetermined value.

17. In a cardiometric apparatus arranged for coin-controlled operation to ascertain the pulse rate and at least the systolic blood pressure, the combination therewith of: means for automatically conditioning the apparatus for another ascertaining operation without a coin if and only if the pulse rate does not exceed a minimum value.

18. In a blood pressure machine, means for cycling the operation of said machine, means for applying pressure to an artery under test, means for sensing arterial pulses, means for automatically increasing the applied pressure from a sub-diastolic level to above the systolic level to occlude flow in said artery during each cycle as aforesaid, means for decreasing said increased pressure in measured quantities at regular intervals, means controlled by said sensing means for temporarily arresting decrease by the means aforesaid following sensing of a certain series of pulses, means for causing resumption of said decrease if additional pulses are not sensed following sensing of said series, means for finally preventing further decrease in pressure during said cycle, provided a certain number of additional pulses are sensed following sensing of said series, means for exhibiting the degree of applied pressure and means for counting the sensed pulses occurring in a given time interval following final prevention of decrease as aforesaid.

19. In a blood pressure machine, coin-controlled means for setting up an operating circuit, means dependent upon said circuit for effecting a measuring test, and means operating automatically for setting up said circuit a second time without employment of a coin provided said testing means effects a measure of less than a given value.

20. In a machine for making test measurements, a control circuit conditioned by use of a coin to render said machine operative, a repeat-operating control circuit for conditioning said machine for an operation independently of said first-mentioned coin-conditioned circuit, said repeat circuit being maintained normally in non-operative condition, and means for rendering said repeat circuit operative as a result of failure of said machine to effectuate a measurement of certain value.

21. In a blood pressure machine, in combination, pulse sensing means, relay means actuated by said sensing means, a timer switch, a commutator switch, means for operating said commutator switch, means for resetting said commutator switch, connections whereby said commutator switch is operated a certain number of times under control of said relay means and operating control therefor is then shifted to said timer switch for a certain number of operations of the commutator switch and there shifted back to said relay means, and means thereafter operable to actuate said resetting means if fewer than a certain number of operations of the commutator switch occur responsive to corresponding operations of the sensing and relay means following resetting aforesaid, and mechanism controlled by said commutator switch.

22. In a blood pressure machine, a timer switch, a commutator switch controlling instrumentalities in said machine, a pulse switch, means for advancing and resetting said commutator switch, and connections whereby said commutator switch is advanced a given number of times under control of said pulse switch, then a given number of times under control of said timer-switch and then automatically conditioned for further advance under control of said pulse switch, said resetting means acting to reset the commutator switch if a given number of advancing operations do not occur responsive to the same number of operations of the pulse switch following automatic conditioning as aforesaid, said commutator switch establishing circuit connections for actuation of certain of the instrumentalities aforesaid as a result of a certain number of advances beyond the aforesaid advances by the pulse and timer switches without resetting.

23. In a blood pressure machine including a pulse-controlled switch, a motor driven switch and a stepping switch, testing and control means comprising: means for stepping said stepping switch, means for resetting said stepping switch, and circuit connections whereby the stepping switch is advanced a plurality of steps under control of said pulse switch and automatically connected for stepping under control of said motor driven switch for a predetermined number of steps and then again automatically connected for stepping by said pulse switch for a certain number of steps, and connections for resetting the stepping switch if said last-mentioned certain number of steps are not taken, together with connections for advancing said stepping switch to a certain position under control of said motor-driven switch if said certain number of steps are taken, and control connections set up by said stepping switch at said certain position.

24. In a blood pressure machine including a pulse-controlled switch, a timer switch and a commutator switch together with means for advancing and returning the same and instrumentalities controlled thereby, when advanced to a certain position, connections for shifting operating circuit connections for said advancing and returning means from said pulse switch to said timer switch, whereby to advance the commutator to said certain position under control of a certain number of operations of the pulse switch occurring in a cetain sequence with at least one advance under control of the timer switch intervening in said sequence, said commutator switch being automatically reset if not advanced to said position under control of the timer and pulse switches operating as aforesaid.

25. In a blood pressure machine, in combination, a pulse switch, a timer switch, an advancible control switch adapted to connect testing means when advanced to a certain position, circuit connections for advancing said control switch under alternate control of the pulse switch and the timer switch to said position in accordance with a predetermined number of advances under control of each, and means for automatically restoring said control switch to a starting condition if it is not advanced to said certain position, as aforesaid.

26. The combination of claim 25 further characterized by the inclusion of means for repeating advance and return of said control switch as set forth until the same is advanced to said certain position.

27. In a blood pressure machine, in combination, a commutator switch adapted to be advanced from a starting position to a certain advanced position to establish a control circuit, a pulse-controlled switch, a timing switch, and means including circuit connections for advancing said commutator switch from starting position a certain amount under control of said pulse switch, then a certain amount under control of said timer switch, and again a certain amount under control of said pulse switch, followed by further advance under control of the timer switch to said certain position, and connections for causing restoration of the commutator switch to said starting position if the same is not advanced to the certain position as aforesaid, and means for restoring said commutator switch to starting position independently of the aforesaid restoration causing means.

28. In a blood pressure machine including pulse sensing means, a pulse-responsive switch and a second switch, means operable in response to sensed pulses for setting up certain circuit connections utilized in the operation of said machine, means for preventing setting up of said connections by anomalous pulses, said means including: a timer switch and connections therefor whereby said second switch means is actuated to set up said certain connections responsive to a plurality of pretermined operations thereof, some of which operations are under control of said pulse-responsive switch, and some of which operations are under control of said timer switch.

29. The invention defined in claim 28 further characterized by the inclusion of means for effecting the said operations of the said second switch means under control of the pulse responsive switch and under control of the timer switch in an alternated relation.

30. In a blood pressure machine, a rate dial, means including a shaft rotated continuously for driving said dial, slip-clutch means interposed drivingly between said dial and said rotating means such that a predetermined restraining force on the dial will prevent motion thereof, releasable means normally applying said restraining force to said rotating means, means for releasing said releasable means to free said dial for motion to a predetermined point, master-cam means tending to rotate with said dial rotating means, a second releasable means normally restraining said master-cam means, means for simultaneously releasing both after movement of the dial to said point, said releasing means and means actuated by the master-cam means following simultaneous release as aforesaid, for interrupting rotation of said shaft as a result of a certain amount of movement of the master-cam means.

31. The combination of claim 30 further characterized by the provision of a first means for conditioning said apparatus for a complete cycle of operation concluded by actuation of the said control means which is actuated by said cam, together with a second means operatively conditioned by said dial, if the latter fails to move more than a certain amount from said predetermined rotative position, for conditioning said apparatus for another cycle of operation provided a cycle has been initiated by the first conditioning means, as aforesaid.

32. In an apparatus for making measurements, an indicator, a control switch, an actuator for said switch, a common means for rotating said indicator and actuator, driving connections between said indicator, actuator and common rotating means so arranged that either the indicator or actuator may be restrained or the same may rotate together, and adjusting means operable to rotatively locate said indicator in a predetermined position of rotation with respect to said actuator and to condition said indicator and actuator for rotative movement during a period limited by said actuator, and means for effecting starting and stopping movements of said indicator during said period.

33. In a measuring apparatus, a rotatable rate dial, a master cam and master switch actuated thereby, a common rotating means for said dial and cam arranged and constructed so that either or both the dial and the cam may be rotated by said common means, means for effecting rotation of the dial by said rotating means from an advanced position to a certain position relative to a predetermined starting point, and means including a brake device cooperable with said cam and driven by said rotating means for effecting rotation of said cam in a certain condition of angular displacement with respect to the indicator upon movement of the indicator from said certain position to said starting point, and means for causing said indicator to make the last-mentioned movement, together with means for effecting arrest of the indicator in advanced positions as aforesaid.

34. In a blood pressure machine, a pulse rate dial, means for advancing said dial at a certain timing rate to various advanced positions, from a starting position responsive to arterial pulses, a master cam rotated at the same timing rate, a master switch actuated by the master cam, a brake device normally arresting said master cam, and means for effecting rotative adjustment of the dial and cam with respect to each other such that the dial and cam will always be in condition to move from a fixed starting position in an initially fixed relationship of angular displacement with each other upon release of said brake device, and pulse-controlled means movable a limited amount in step with said dial for releasing said brake device.

35. In apparatus of the class described, a drive shaft, motor means for driving said shaft, a rate dial, a master cam, slip clutch means drivingly connecting said dial and said cam for rotation by said shaft, releasable means normally restraining said dial against rotation and said cam against rotation, means cooperable with said releasing means for effecting independent rotation of said dial and cam to predetermined starting positions, means for releasing said restraining means for the cam and effecting a cycle of rotation of said cam by said shaft, means conditioned by said cam during said cycle of rotation for rendering said releasable means for the dial operable during the said cycle of rotation.

36. In apparatus of the class described, a rate dial, a master cam, a source of driving power for said dial and cam, clutch means drivingly connecting said dial and cam with said driving power and arranged to permit joint or independent rotation of the dial or cam, means for effecting timed rotation of said cam through a predetermined cycle of travel from a starting position, means for effecting intermittent rotative movements of said dial during each said cycle of the cam, and control means for said apparatus actuated by said cam and including means for rendering said intermittent rotative movement effecting means operable during said cycle of the cam.

37. In apparatus of the class described, a rate dial, a master cam, source of driving power for said dial and cam, clutch means drivingly connecting said dial and cam with said driving power and arranged to permit joint or independent rotation of the dial or cam, means operable for effecting independent rotation of the dial and cam, means for effecting relative adjusting movements of said dial and cam whereby the dial is positioned in a predetermined rotative starting position relatve to said cam and the cam and dial thereby conditioned to start for joint rotation in step from said position, means for effecting timed rotation of said cam through a predetermined cycle of travel from said starting position, means for effecting intermittent rotative movements of said dial during each said cycle of the cam, and control means for said apparatus actuated by said cam, together with a first means for conditioning said apparatus for a complete cycle of operation concluded by actuation of the said control means which is actuated by said cam, and a second means operatively conditioned by said dial, if the latter fails to move more than a certain amount from said predetermined rotative position, for conditioning said apparatus for another cycle of operation, provided a cycle has been initiated by the first conditioning means aforesaid.

BRADLEE W. WILLIAMS.
HOMER S. WILLIAMS.